May 29, 1956     E. R. McCARTER     2,748,348
TESTING GEOPHONE PERFORMANCE
Filed May 7, 1952     2 Sheets—Sheet 1

Ed Raymond McCarter Inventor
By W. O. T Heilman Attorney

United States Patent Office 2,748,348
Patented May 29, 1956

2,748,348

TESTING GEOPHONE PERFORMANCE

Ed Raymond McCarter, Tulsa, Okla., assignor to Esso Research and Engineering Company, a corporation of Delaware Application May 7, 1952, Serial No. 286,652

6 Claims. (Cl. 324—158)

The present invention concerns a method and apparatus for testing the performance of seismic pickups or geophones, being particularly adapted for use by prospecting crews while at the actual location of the seismic survey.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors known as geophones, which translate the detected motion into electrical impulses which are suitably amplified and recorded as traces on a seismograph record, the traces being essentially rectangular coordinate graphs of earth motion velocity (or displacement, or acceleration, depending on the type of geophone used) versus time. From subsequent examination of the seismograph record it is possible to determine the length of time required for the arrival of seismic waves at particular points on the earth's surface either directly from the source or by reflection from underlying strata. From other data obtained in the area under study, such as the measured seismic wave velocities in the various earth layers, it is then possible to estimate the depths of the various indicated reflecting substrata.

It is of course obvious that if the individual geophones are not operating properly a reliable seismic record will not be obtained. Hence many methods have been devised for the testing of geophones but most of these are not readily adaptable to field use but must rely on equipment that is more suitably maintained at a permanent location, such as an office or laboratory. Among the tests commonly used are the ball drop test which involves placing the geophones on a vibration-free support and dropping a weight or ball onto the support and checking the geophone response. Another test method is the shaking table test which involves placing the geophone on a support that is subjected to controlled vibrations. Since shaking tables are not conveniently portable and since the ball drop test is rather cumbersome, neither of these tests is conveniently adapted for use in the field.

It is one object of the present invention to provide a method and apparatus that will serve to check the performance of geophones reliably and quickly with apparatus that can be readily transported along with the conventional seismic equipment.

In accordance with this invention a geophone is tested by feeding the geophone a repeated pulse of current which has a short time duration compared with the natural frequency of the geophone. These pulses pull the coil of the geophone down and cause a voltage to be generated by the geophone when the coil is released. The generated voltage is applied to an oscilloscope and the trace produced on the oscilloscope screen can be used for measuring the damping factor and sensitivity of the geophone, the appearance of the trace giving an indication as to whether or not the geophone is dragging and whether or not there is an open circuit or short in the geophone coil.

The nature and objects of this invention and the manner in which it is utilized will be more fully appreciated from the ensuing description and the accompanying drawing in which.

Figure 1:
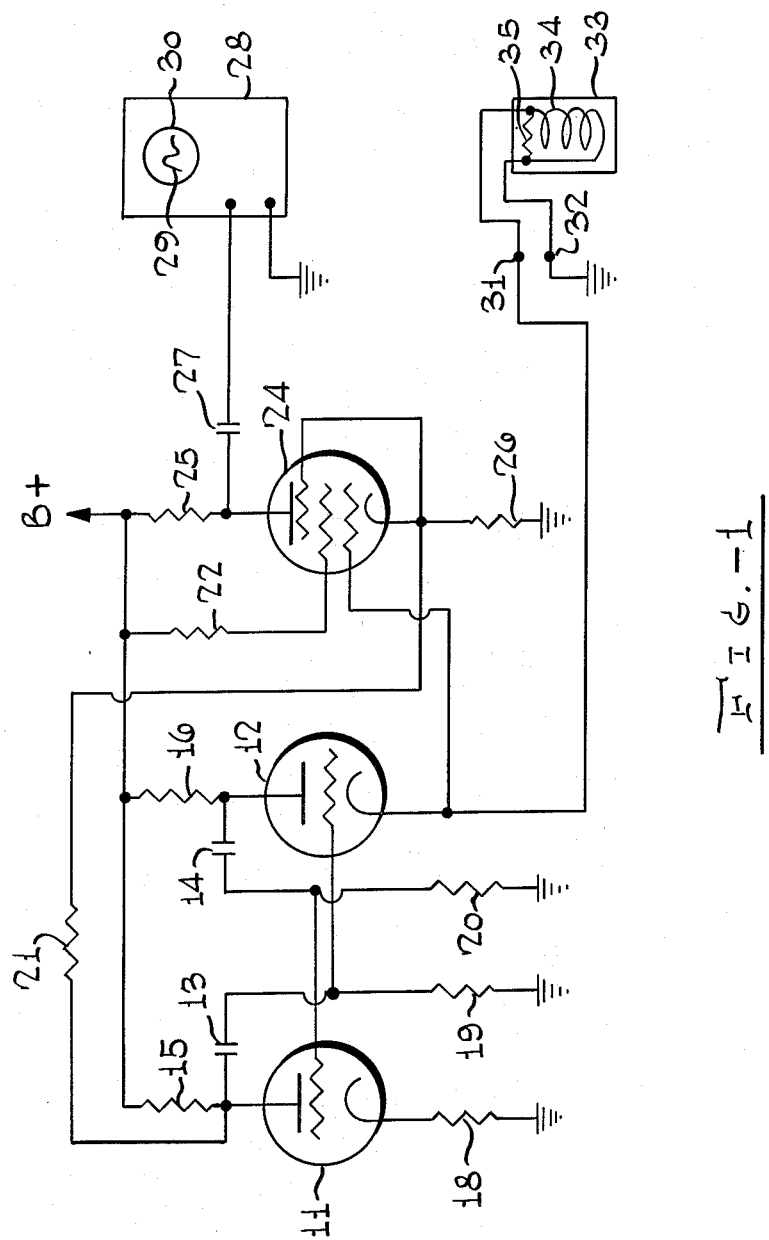
Fig. 1 is a diagram of one form of circuit that may be used in practicing this invention.

Referring now to Fig. 1, a diagram of one form of circuit that may be used in practicing this invention is presented. The pulses of current that are fed to the geophone may be obtained from a square wave generator, a multivibrator or any other equivalent source. As shown in Fig. 1 a multivibrator is used comprising two triodes 11 and 12, the plate of triode 11 being coupled to the grid of triode 12 through capacitor 13 and in the same manner the plate of triode 12 being coupled to the grid of triode 11 through capacitor 14. The values of capacitors 13 and 14 and of grid resistors 19 and 20 are so selected that a pulse of the desired width or time duration will appear on the cathode of triode 12. The RC time constant of capacitor 14 and resistor 20 determines the duration of each pulse and the RC time constant of capacitor 13 and resistor 19 determines the frequency of the pulses. The coil 34 of the geophone to be tested is placed in the cathode circuit of triode 12 through terminals 31 and 32. The geophone, indicated schematically as element 33, may be provided with a damping resistor 35 shunted across the coil.

As previously mentioned, the voltage pulses generated by the geophone in response to the pulses fed from the multivibrator are applied to an oscilloscope and the trace thus produced is studied. It is preferred that the output voltage from the geophone be amplified before it is fed into the oscilloscope and this is done in the circuit of Fig. 1 by applying the output voltage to the grid of a conventional amplifier stage having an unbypassed cathode. This amplifier stage comprises a pentode 24 with its associated plate resistor, screen grid resistor and cathode resistor. The output from the amplifier stage is fed into an oscilloscope 28 through coupling capacitor 27. The sweep circuit of the oscilloscope is synchronized with the pulse frequency of the multivibrator and the output pulse from the geophone appears as a trace 29 on the screen 30.

Figure 2:
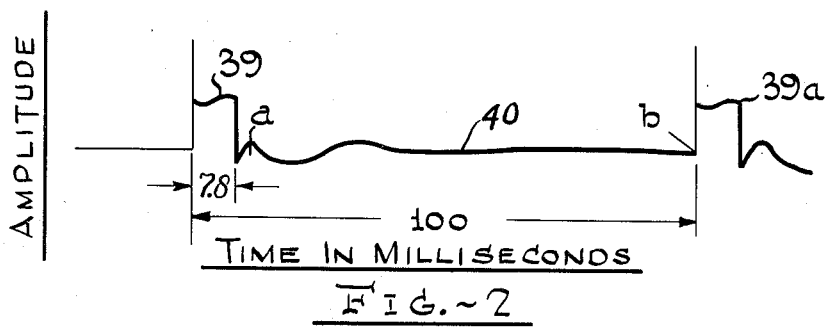
Fig. 2 is a graphical representation of the output signal from the multivibrator section of a representative embodiment of the circuit of Fig. 1.
Figure 3:
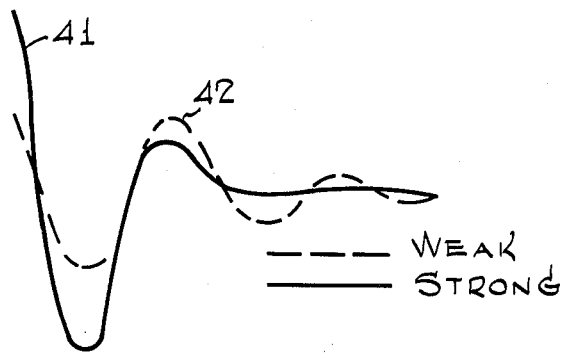
Fig. 3 is a graphical representation of an expanded portion of the trace of Fig. 2 together with a corresponding expanded trace to show comparison between a good and a poor geophone.
Figure 4:
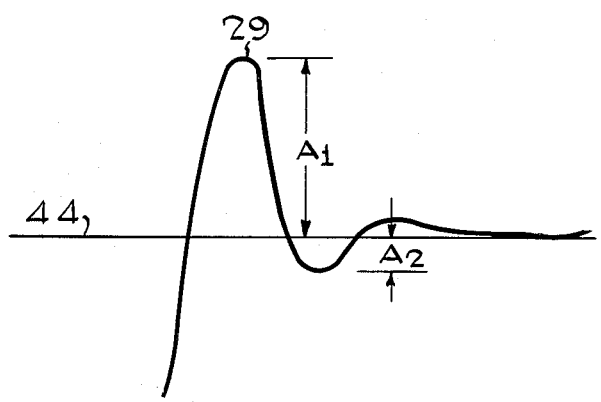
Fig. 4 is a representative signal trace as it appears on the oscilloscope screen of Fig. 1.

The nature of the pulses produced from the circuit of Fig. 1 may be ascertained from Figs. 2, 3 and 4. In Fig. 2 is shown a representative trace as it would appear if the oscilloscope were connected to the cathode of triode 12 when a resistor-damped geophone is connected across the geophone terminals 31 and 32. This trace comprises a driving pulse 39 followed by the generated signal pulse 40 and a second driving pulse 39a. The portion of the trace 40 which is of interest lies between points a and b. It will be noted that in this example the driving pulse 39 has a duration of 7.8 milliseconds and that the pulse frequency is 10 per second, i. e., there are 100 milliseconds between each pulse. The pulse frequency is ordinarily selected so that the generated signal pulse will come nearly to rest before the next driving pulse occurs.

In Fig. 3 the solid line 41 represents the amplified trace 40 of Fig. 2 between points a and b and the dashed line 42 represents a similar trace, line 41 being the trace for a geophone having a good magnet and line 42 a trace for a geophone having a weak magnet. A jagged trace would indicate that the geophone is dragging. With a little practice, the operator can readily distinguish a satisfactory geophone from one that is not.

The reason that the strength of the magnet in the geophone affects the trace amplitude is that the driving pulse will not pull the coil of a geophone with a weak magnet down as far as it will the coil of a geophone with a strong magnet. Furthermore when the coil of the weak magnet geophone is released the generated voltage will be lower than if the magnet had been strong, i. e., if the coil had been pulled down farther. Therefore the net result is that the generated voltage fed to the amplifying stage and thence to the oscilloscope varies as the square of the field strength of the geophone magnet.

As mentioned above, the portion of the signal trace which is of interest for measuring geophone response lies between points $a$ and $b$ on trace 40 of Fig. 2. Hence, it is desirable to eliminate from the trace as it appears on the oscilloscope screen the portion of the trace that represents the driving pulse. This is done by supplying a gating signal during the time of the driving pulse, this gating signal being provided in the circuit of Fig. 1 by connecting the plate of triode 11 with the cathode of pentode 24 through a resistor 21 which adjusts the amplitude of the gating signal. In Fig. 4 is shown a representative trace 29 as it appears on the oscilloscope screen. It will be noted that this trace is shown in reverse as compared with the traces in Fig. 3, this resulting from the fact that the output signal from the amplifying stage is 180° out of phase with the signal that appears at the cathode of tube 12.

If it is desired to determine the damping factor of any geophone being tested, this can be calculated from the distances $A_1$ and $A_2$ of the trace as measured from the horizontal reference line 44 of the scale on the conventional oscilloscope screen. Knowing these two distances the damping factor $n$ can be calculated as follows:

$$\log_e \frac{A_1}{A_2} = E$$

$$n = \frac{E}{\sqrt{E^2 + \pi^2}}$$

As a representative example of an operable circuit using the diagram of Fig. 1, triodes 11 and 12 may comprise the two halves of a 12AU7 double triode, and pentode 24 may comprise a 9001 tube. The resistors in the circuit may have the following values.

| Resistor: | | Resistance |
|---|---|---|
| Cathode resistor 18 | ohms | 100 |
| Plate resistors 15 and 16 | do | 10,000 |
| Grid resistor 19 | megohms | 10 |
| Grid resistor 20 | ohms | 800,000 |
| Feedback resistor 21 | do | 400,000 |
| Cathode resistor 26 | do | 6800 |
| Grid resistor 22 | megohms | 1.6 |
| Plate resistor 25 | ohms | 620,000 |

Capacitors 13 and 14 will have capacitance values of 0.005 microfarad and capacitor 27 0.5 microfarad. The B+ voltage source is 180 volts. The multi vibrator portion of this circuit will give pulses having a duration in the range of 7 to 10 milliseconds and the variation in resistance of the various geophones under test will have a negligible effect upon the pulse duration and will have no effect upon the time allowed for the geophone transient response.

It is to be understood of course that the specific values given above are merely by way of example and that this invention is not to be limited thereby. It is desirable that the pulses fed to the geophone by the multivibrator or equivalent circuit should have short time duration as compared with the natural frequency of the geophone under test. Thus for a geophone having a natural frequency of say 35 cycles, driving pulses having a duration of say from 5 to 10 milliseconds may be used.

The scope of this invention is to be limited only by the following claims.

What is claimed is:

1. An apparatus for checking the performance of a geophone comprising a pulse source automatically furnishing periodic electrical pulses, means feeding said pulses through the coil of the geophone and means for measuring the wave forms of the pulses generated in the geophone as the result of said periodic pulses.

2. Apparatus as defined by claim 1 wherein source is arranged to provide pulses having a short time duration compared to the natural frequency of the geophone.

3. An apparatus for checking the performance of geophones comprising a circuit furnishing repeated electrical pulses of short duration, means connecting the output of said circuit to a geophone, an oscilloscope, and means connecting the geophone to the oscilloscope whereby the wave forms of the voltages generated by the geophone may be observed.

4. Apparatus as defined by claim 3 including an amplifier stage between the geophone and the oscilloscope.

5. Apparatus as defined by claim 3 wherein the circuit furnishing repeated electrical pulses comprises a multivibrator circuit.

6. An apparatus for checking the performance of geophones comprising a multivibrator circuit including at least two legs each having a cathode and a plate, means connecting a geophone to the cathode of one leg of the multivibrator circuit, an oscilloscope, means connecting the geophone to the oscilloscope whereby the wave forms of the voltages generated by the geophone may be observed, an amplifier stage between the geophone and the oscilloscope, and a resistor connecting the plate of the other leg of the multivibrator with the cathode of the amplifier stage whereby a gating pulse is provided for each driving pulse from said multivibrator to cancel said driving pulse from appearing on the screen of the oscilloscope.

References Cited in the file of this patent

UNITED STATES PATENTS

| 2,423,970 | Gardner | July 15, 1947 |
| 2,600,967 | Chernosky | June 17, 1952 |

FOREIGN PATENTS

| 663,687 | France | Aug. 23, 1929 |